United States Patent [19]

Kessmar

[11] 4,104,929
[45] Aug. 8, 1978

[54] SHIFT MECHANISM
[75] Inventor: Leo R. Kessmar, Northwood, Ohio
[73] Assignee: Dana Corporation, Toledo, Ohio
[21] Appl. No.: 793,224
[22] Filed: May 2, 1977
[51] Int. Cl.² .............................................. G05G 9/14
[52] U.S. Cl. ..................................... 74/473 R; 74/504
[58] Field of Search ............. 74/471 R, 473 R, 473 P, 74/473 SW, 475, 476, 477, 504

[56] References Cited
U.S. PATENT DOCUMENTS

| | | | |
|---|---|---|---|
| 1,960,296 | 5/1934 | Bullard | 74/473 R |
| 2,407,322 | 9/1946 | Morrison | 74/471 R |
| 2,814,209 | 11/1957 | Pool et al. | 74/477 |
| 2,861,465 | 11/1958 | Winkle et al. | 74/484 X |
| 3,242,757 | 3/1966 | Winkler et al. | 74/473 R |

Primary Examiner—Allan D. Herrmann
Attorney, Agent, or Firm—Robert M. Leonardi; Robert E. Pollock

[57] ABSTRACT

A shift mechanism comprises a shift lever adapted to effect the engagement of transmission gears. The lever has a main shaft which is rotatable about its axis and pivotable in a plane containing its axis. Shifting is therefore effected by a combination of rotary and straight line movements. A rigid member extends from a bottom portion of the lever main shaft to a location radially spaced from the main shaft axis to effect a selection of gates of the transmission when the shift lever is rotated.

24 Claims, 8 Drawing Figures

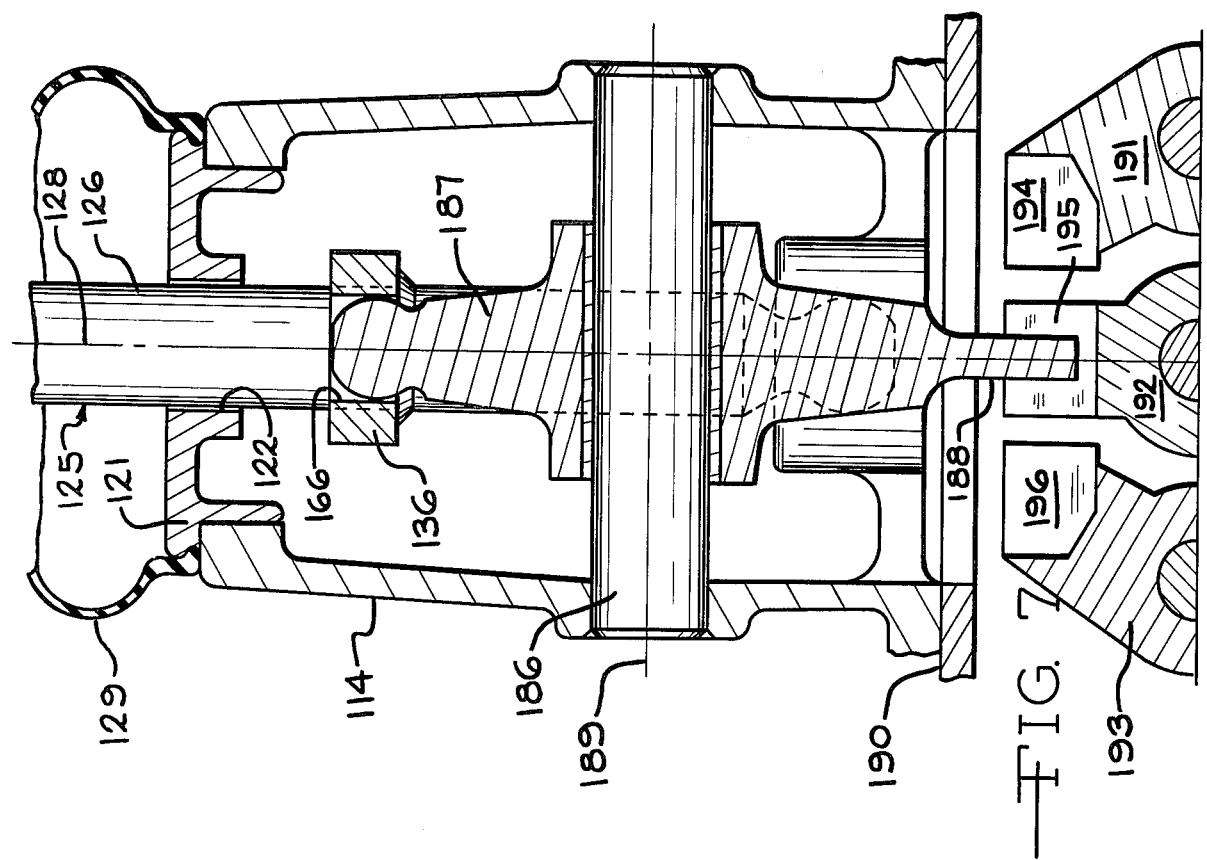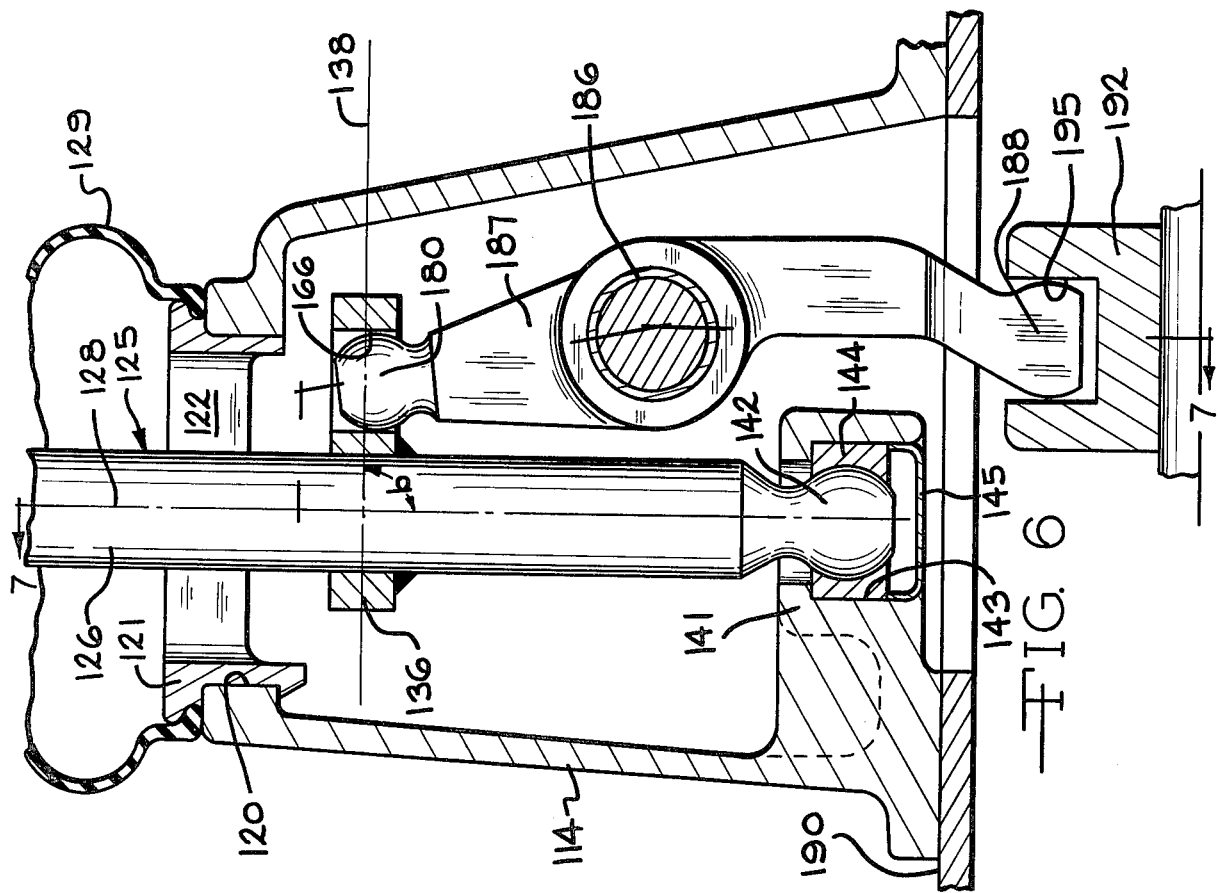

SHIFT MECHANISM

BACKGROUND OF THE INVENTION

The present invention relates generally to multi-speed transmissions and more particularly to shift mechanisms for selectively engaging gears of these transmissions.

The development of manual shift multi-speed transmissions has created the problem of providing a shift mechanism which is capable of effecting all of the required transmission gear shifts while maintaining a relatively simple shift pattern. Shift mechanisms generally include a pivotable shift lever and may include a series of linkages operatively connected with the shift lever and adapted to engage and disengage gears of an associated transmission.

Conventional multi-speed transmissions utilize shift forks to axially drive gears into engagement, with each shift fork capable of engaging two gears. A plurality of shift forks is therefore required in a transmission having more than two speeds. Each shift fork is affixed to an axially slidable shift rod, with all of the shift rods of the transmission being adjacent and parallel. Most shift forks have a lug for driving engagement with the shifting mechanism. When all gears are in a neutral position, the lugs of each shift fork are generally laterally aligned with each other. The shifting mechanism must be capable of selectively engaging each of the shift fork lugs to drive each shift fork.

In some vehicles the driver's or operator's compartment is crowded and the need for a simple shift pattern becomes more pronounced. For example, in many heavy duty trucks the driver's compartment is located directly over the engine, with the engine projecting upward above the floor level of the compartment. The portion of the engine which projects into the driver's compartment is enclosed by a heat and sound insulating cover located between the driver and passenger seats. A multi-speed transmission is operatively affixed to the rear or output portion of the engine at a location substantially behind the driver's seat. A remote control shifting mechanism is therefore utilized to effect a shifting of the transmission gears. The gear shift lever normally used in these heavy duty trucks projects upward from the floor of the driver's compartment between the driver's seat and the engine cover. Shift levers of this type are conventionally pivotable in a forward and backward direction and in a sideways or lateral direction. A lateral pivoting of the shift lever affectuates a selecting of the aligned shift forks of the associated transmission while a forward or backward pivoting drives a selected shift fork backward or forward, thereby selectively engaging or disengaging the gears associated with the shift fork.

The space problems in the driver's compartment become more evident as the number of gears in the transmission increases. More lateral pivoting of the shift lever is required as more shift forks are used in the transmission. Obstruction of lateral movement of the shift lever by the driver's seat or the engine cover becomes an increased possibility.

In other types of vehicles such as smaller trucks or passenger cars, the transmission is located directly under the driver's compartment and a remote control shift mechanism is not required. The shift lever may extend from a direct control shift mechanism mounted on the transmission or may extend directly from the shift forks within the transmission. However, in either situation, sideways or lateral pivoting of the shift lever has heretofore been required to select one of a plurality of shift forks within the associated transmission. Seats or other equipment within the driver's compartment may obstruct or interfere with the lateral or side movement of the shift lever.

SUMMARY OF THE INVENTION

It is an object of the present invention to reduce the lateral shift lever movement required for the operation of a multi-speed transmission.

This and other objects of the present invention which will become apparent from the following detailed description are achieved by a shift lever comprising a main shaft having a generally longitudinal axis about which it is rotatable. A rigid member extends from a bottom portion of the main shaft and is radially spaced from the main shaft axis. The rigid member is adapted for operative association with shift forks of a transmission.

BRIEF DESCRIPTION OF THE DRAWINGS

FIG. 6 is a vertical cross-sectional view of an alternative embodiment of the shift mechanism of the present invention adapted for use with a direct control shifting unit.

FIG. 7 is a cross-sectional view of the shift mechanism of FIG. 6 taken through line 7—7.

DETAILED DESCRIPTION OF A PRESENTLY PREFERRED EMBODIMENT

Figure 1:
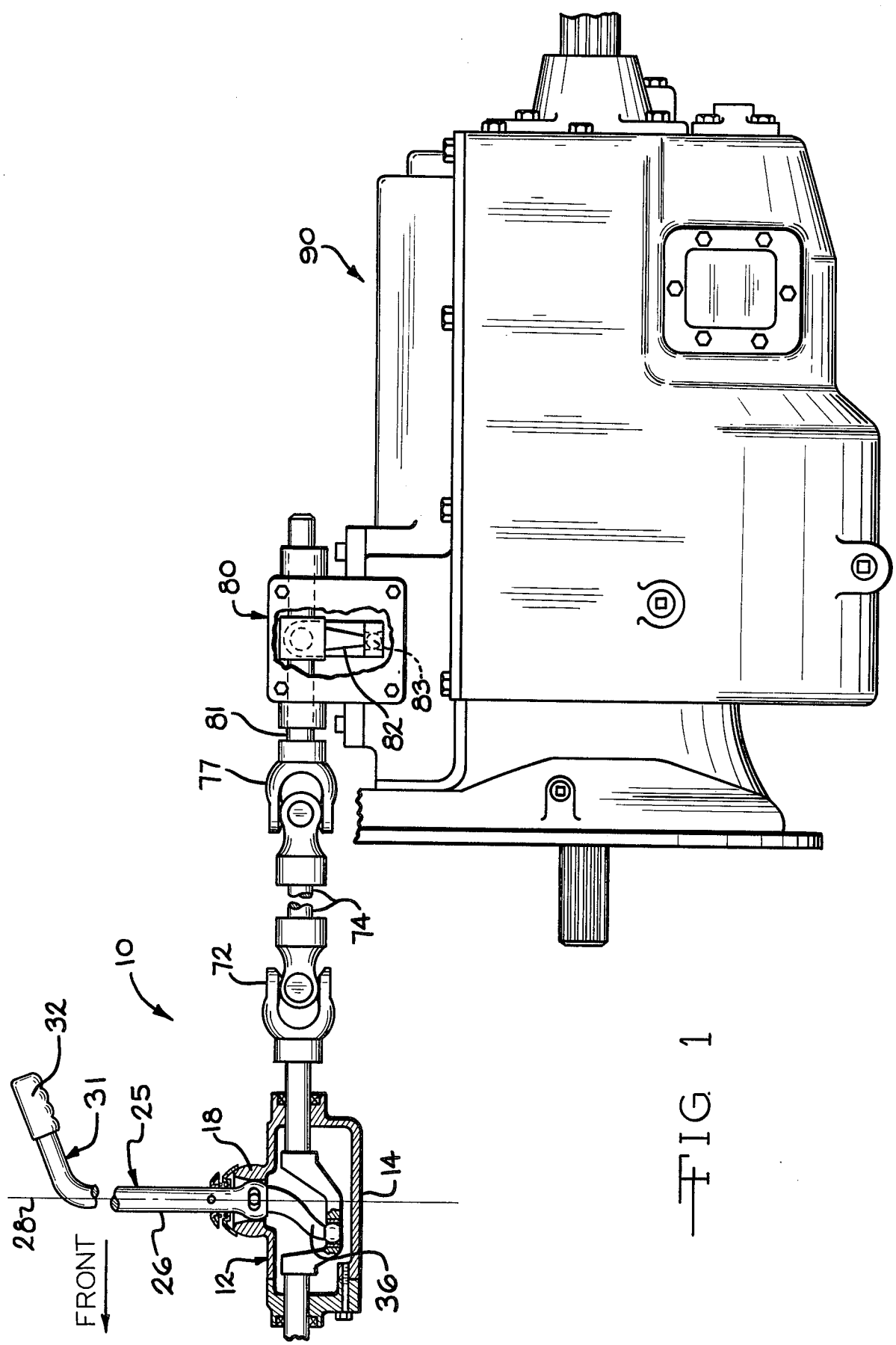
FIG. 1 is a side view of a shift mechanism of the present invention adapted for use with a remote control shifting unit. Also shown is the linkage between the shift lever and a multispeed transmission.

Referring to FIG. 1, a shift lever assembly 10 is operatively associated with a five speed synchronized transmission 90 for a heavy duty vehicle such as a truck. The assembly 10 includes a remote control unit 80 mounted on the transmission 90 and an independent control unit 12 mounted adjacent the operator or passenger compartment of the vehicle. The remote and independent control units are mechanically linked as will hereinafter be described.

Figure 2:
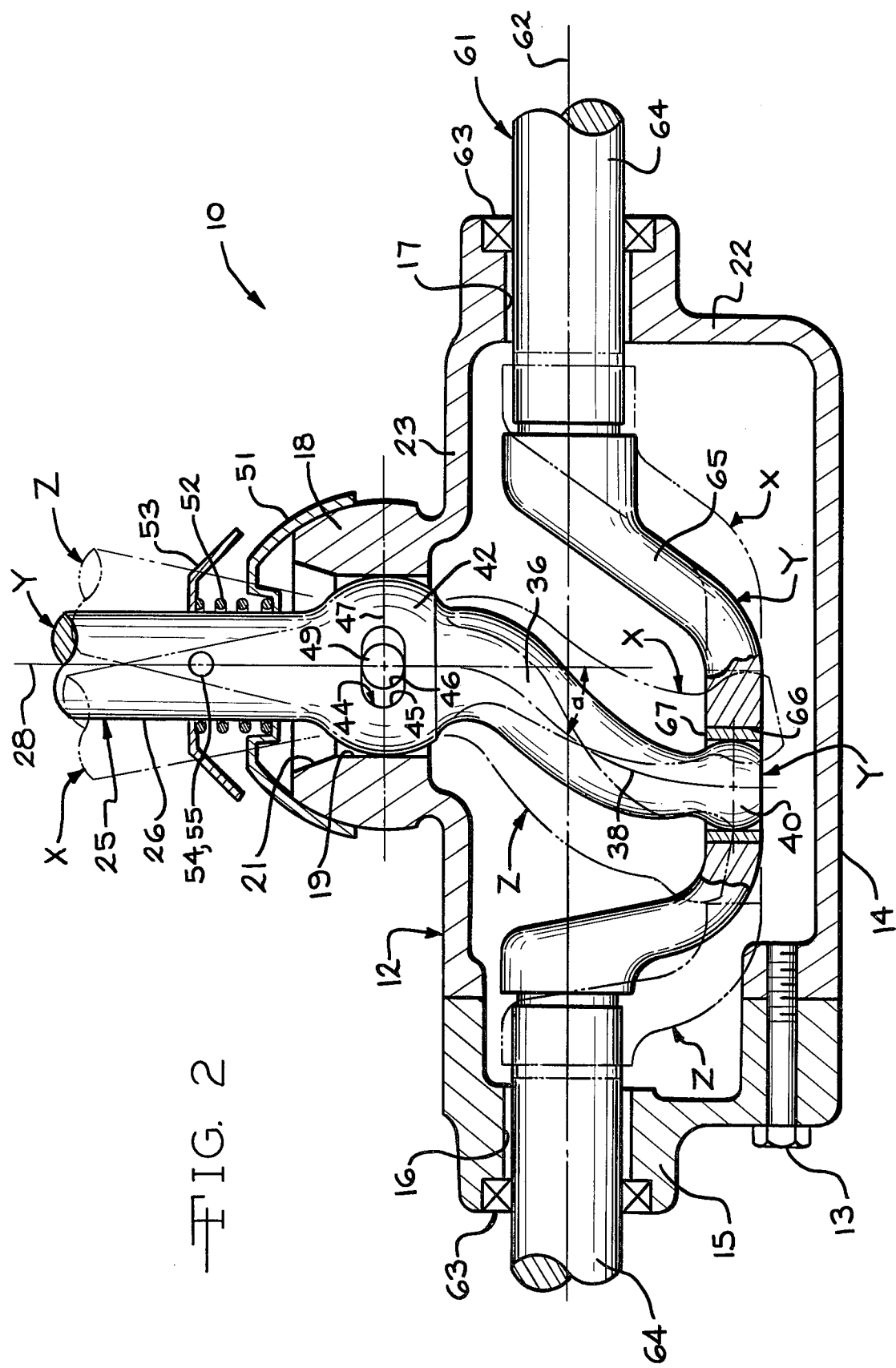
FIG. 2 is an enlarged cross-sectional view of a portion of the shifting mechanism of FIG. 1.

As can be more clearly seen in FIG. 2 the independent control unit 12 has a five sided housing or enclosure 14 which includes a rear wall 22 and a top wall 23. A front cover plate 15 is secured to the housing 14 by means of bolts 13. The front plate 15 has a front cylindrical bore 16 adapted to partially contain an independent control shift bracket 61 as will hereinafter be described. The rear wall 22 contains a rear cylindrical bore 17 of the same diameter as and axially aligned with the front bore 16. The top wall 23 of the housing 14 has an upwardly extending lug or flange 18 having a port 19 extending therethrough. The upper portion of the port 19 has a frusto-conical surface 21 which provides clearance for pivotal movement of a shift lever 25.

The shift lever 25 comprises a main shaft 26 having a generally longitudinally extending main shaft axis 28 about which it is rotatable. The main shaft 26 may extend out of the direct control unit 12 from about 10 to 40 inches, depending upon the type of vehicle with which it is used, the height of the driver's seat, etc. Rigidly attached to the upper end of the main shaft 26 is a handle 31 for rotating and pivoting the shift lever 25. The handle 31 is illustrated in FIG. 1 as an integral rearwardly bended extension of the main shaft 26 having a rubber or plastic grip 32. The "handle bar" 31 facilitates rotation of the shift lever 25 and readily indicates the angle at which the lever 25 is disposed. However, other types of handles, such as a spherical knob or a "T" handle, which may incorporate means for determining the angle at which the lever 25 is disposed, may also be utilized with the shift lever of the present invention.

Figures 3, 4, 5:
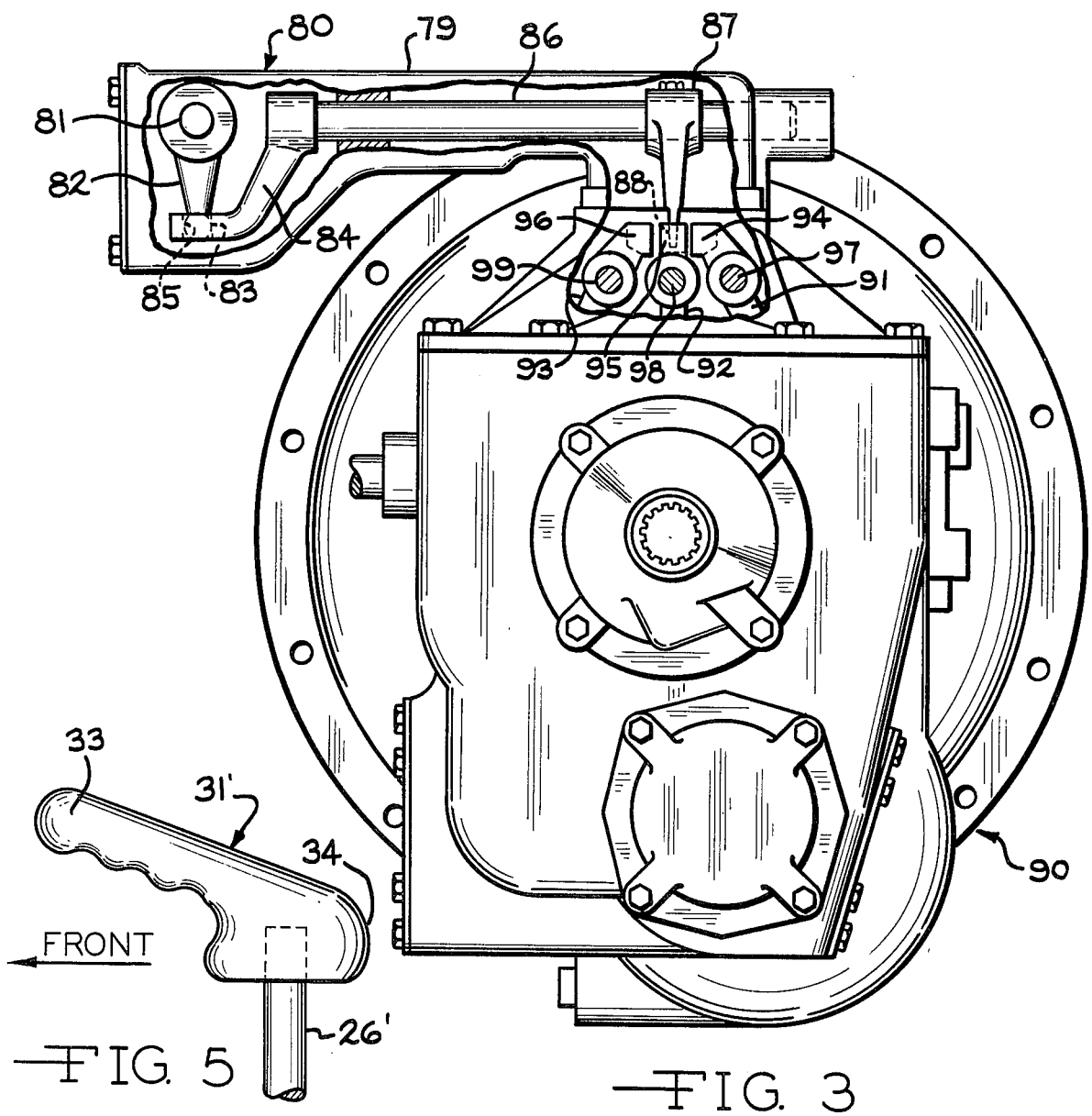
FIG. 3 is an end view of the multi-speed transmission of FIG. 1 partly cut-away for clarity.
FIG. 4 is a cross-section plan view of the shift mechanism of FIG. 2.
FIG. 5 is a side elevation view of an embodiment of the handle portion of the shift lever of the present invention.

FIG. 5 illustrates an alternative shift lever handle 31' formed of hard rubber or plastic. The handle 31' is threaded onto the top of the main shaft 26'. The handle 31' comprises a narrow cylindrical shaped finger grip portion 33 and a larger spherical shaped heel portion 34 adapted for contact with the palm of an operator's hand for pushing the shift lever forward. The finger grip portion 33 points toward the front of the vehicle and slightly upward and therefore serves to indicate the angle at which the shift lever is disposed.

Referring now to FIG. 2, integral with and disposed at the lower end of the main shaft 26 is a rigid offset shaft or finger which forms a shift bracket engaging means 36. The offset shaft 36 has a generally longitudinal axis 38 which extends at an angle "a" relative to the main shaft axis 28. The offset shaft 36 in the embodiment of FIG. 1 is curved, but it is understood that a straight shaft may also be utilized in the present invention. Integral with and disposed at the lower end of the offset shaft 36 is a truncated spherical member 40 for drivingly engaging the shift bracket 61. The spherical shape of the member 40 is preferred to faciliate relative pivotal movement between the member 40 and the bracket 61 as the shift lever 25 is rotated and/or pivoted.

Integral with and disposed between the main shaft 26 and the offset shaft 36 is a generally spherical bulb forming shift lever pivot means 42. The bulb 42 is disposed within the cylindrical bore 19 in the independent control unit housing 14 and has a diameter approximating that of the bore 19. As can be more clearly seen in FIG. 4, a pivot pin bore 44 having a generally flattened hourglass shape extends through the sphere 42. The bore 44 extends in a direction generally perpendicular to the main shaft axis 28. The bore 44 has a center portion 46 having a generally circular cross-section and two end portions 45 having generally elongated cross-sections. Each elongated or oblong end portion 45 has a major axis 47 which extends in a plane generally perpendicular to the main shaft axis 28. A generally cylindrical pivot pin 49 is rigidly affixed to the flange 18 and extends through the flattened hourglass bore 44. The diameter of the pin 49 is approximately that of the center portion 46 of the bore 44. The pivot pin 49 therefore fits snugly within the bore 44 but allows a limited rotating of the shift lever 25. The pin 49 also permits a pivoting of the shift lever 25 in a plane perpendicular to the pin 49, while preventing a lateral pivoting thereof.

An inverted cup or cover 51 for containing grease or other lubricant within the pivot mechanism is fitted over the flange 18. The cup 51 fits tightly around the main shaft 26 and moves with the shaft as it rotates or pivots. A compression spring 52 biases the cup 51 downward for a secure fit with the flange 18. The spring 52 is held against the cup 51 by a spring retainer 53 which is secured by a pin 55 through a cylindrical bore 54 in the main shaft.

A bracket 61 having a generally longitudinal axis 62 extends through the independent control unit 12. Each end portion 64 of the bracket 61 extends through a bore 16 or 17 in the unit 12. Each bore 16 and 17 contains an oil seal 63 for sealingly engaging the bracket 61 while permitting both axial and rotational movement with respect thereto. Intermediate the end portions 64 of the bracket and rigidly affixed thereto is an offset portion 65 which is radially spaced from the axis 62 of the bracket. The offset portion 65 is a generally "U" shaped member affixed to the end portions 64 by welding or any other suitable means. The offset portion 65 contains a cylindrical aperture 66 which is fitted with a hardened cylindrical bushing 67. The inside diameter of the bushing 67 is such as to snugly fit about the bracket engaging sphere 40 of the offset shaft 36. The sphere 40 extends into the opening 66 and bushing 67 and is in a driving pivotal engagement therewith.

Referring again to FIG. 1, a universal joint 72 is attached to the rearward end portion 64 of the bracket 61 in a manner well known in the art. Similarly the other end of the joint 72 is secured to one end of a shaft or linkage 74 which extends between the independent control unit 12 and the remote control unit 80. A second universal joint 77 links the other end of the shaft 74 to an outer shaft 81 which extends through the remote control unit 80. Universal joints such as 72 and 77 are utilized in the shift assembly because the shift bracket 61 and the outer shaft 81 most often do not lie on a common axis. Depending upon the particular vehicle involves, additional shafts or linkages such as 74 may be included in the shifting assembly 10.

As is more clearly seen in FIG. 3, the remote control unit 80 comprises a housing or cover 79 which is mounted on the top of the multi-speed synchronized transmission 90. The outer shaft 81 passes through the housing 79 at a location laterally spaced from the center of the transmission 90. Rigidly affixed to the outer shaft 81 is an outer shift finger 82 which extends downward and terminates in a spherical bracket contact member 83.

The outer shift finger 82 is adapted to rotatably and laterally drive a cross shaft bracket 84. The bracket 84 is rigidly attached to one end of the cross shaft 86 which extends through the housing 79 in a direction transverse to the axis of the outer shaft 81. The bracket 84 extends generally downward and outward from the cross shaft 81 and accepts the bracket contact member 83 in an aperture 85.

A shift finger 87 is affixed to the cross shaft 86 at a location above a center portion of the transmission. Similar to the outer shift finger 82, the shift finger 87 extends downwardly and terminates in a shift fork engaging lug 88. The lug 88 is adapted to selectively engage three lugs 94, 95 and 96, each of which extend upwardly from a shift fork 91, 92 and 93, respectively. Each of the three shift forks, 91, 92 and 93 rides on a shift rod 97, 98 or 99 respectively, which extends the length of the transmission 90. The shift forks 91, 92 and 93 are adapted to axially drive selected gears of the transmission to effect an engagement or disengagement thereof.

The shift forks 91, 92 and 93 each have a "fore" and an "aft" position, with each position corresponding to engagement of a different transmission gear. A positioning of the shift forks intermediate the fore and aft positions corresponds to a neutral position of the associated gears. Shift fork 91 engages the low or first gear and the reverse gear in the fore and aft positions, respectively. Similarly shift forks 92 and 93 engage the second and third gears and fourth and fifth gears, in the aft and fore positions, respectively. A description of the internal components of the transmission and the mechanics of synchronization and shifting of the gears will not be set forth herein as they are well known in the art.

For a more thorough understanding of the present invention a description of the operation of the previously described embodiment is set forth. The directions forward, rearward, leftward and rightward are given in this description with respect to a person sitting in the driver's seat of a vehicle utilizing the remote control shifting unit. Clockwise and counterclockwise directions are given with respect to the shaft 26 as seen in FIG. 4, unless otherwise noted.

First gear of the transmission 90 is usually engaged when the vehicle is started from a dead stop. When first gear is engaged, the shift lever 25 is rotatively positioned in its extreme clockwise position, with the offset shaft 36 and the offset portion 65 of the bracket 61 thereby in their respective first shift fork engaging positions R. The shift bracket 61, linkage 74, outer shaft 81 and the outer shaft finger 82 are all accordingly rotatively positioned. The outer shift finger 82, outer shift bracket 84, cross shaft 86 and shift finger 87 are all at their rightwardmost positions. The shift finger lug 88 is therefore adapted for engagement with the lug 94 of the first shift fork 91.

Furthermore, referring to FIG. 2, in first gear the main shaft 26 is pivoted about the pivot pin 49 to its rearwardmost position Z and the offset shaft 36 is pivoted to its forwardmost position Z. The bracket 61 is thereby also in its forwardmost position Z, along with the linkage 74, outer shaft 81, and outer shift finger 82. The outer shift bracket 84, cross shaft 86 and shift finger 87 are thereby rotated to their forwardmost positions. The first shift fork 91 is therefore in its "fore" position, which corresponds to an engagement of first or low gear.

To shift from first gear to second gear, the operator must firstly disengage first gear by pivoting the main shaft 26 forwardly about the pivot pin 49 from its first gear engagement position Z to a neutral position Y. The flattened hourglass shape of the bore 44 permits pivoting of the shift lever notwithstanding any clockwise or counterclockwise position of the lever. Forward pivoting of the main shaft 26 about pivot pin 49 from its position Z to position Y causes a generally rearward pivoting of the offset shaft 36 from position Z to a neutral position Y and a rearward movement of the bracket 61 to its neutral position Y. The linkage 74 is driven rearwardly, thereby also driving the outer shift finger 82 rearwardly and rotating the cross shaft bracket 84, the cross shaft 86 and the shift finger 87 to their respective neutral psoitions. The shift fork 91 is driven rearwardly by the shift finger lug 88 along with the shift rod 97, disengaging the first or low gear.

The shift lever 25 is then rotated counterclockwise, with the main shaft 26 rotating about its axis 28. The flattened hourglass bore 44 permits rotation of the pivot means 42 about the pivot pin 49 while simultaneously supporting the shift lever 25. Rotation of the main shaft 26 causes rotation of the offset shaft 36, with the bracket engaging means 40 and the bracket offset portion 65 moving in an arcuate path from their respective first shift fork engaging positions R to their second shift fork engaging position S. The bracket engaging bulb 40 drivingly rotates the offset portion 65, thereby rotating the bracket 61 about its axis 62. This rotation is transmitted by the linkage assembly to the remote control unit 80 which converts the rotation into linear motion. Rotation of the outer shift finger 82 drives the cross shaft bracket 84 and the cross shaft leftwardly until the shift finger 87 is aligned with the lug 95 on the second shift fork 92.

After this rotation of the shift lever 25, the operator engages the second gear by pivoting the main shaft 26 forwardly to its position X along the same path or in the same plane as in disengaging the first gear, thereby pivoting the offset shaft 36 and the shift bracket 61 to their rearward positions X. This rearward motion will be transmitted to the remote control unit, ultimately rotating the shift finger 87 to its rearwardmost or "aft" position, pushing the second shift fork 92 rearwardly and engaging second gear.

Rotation of the shift lever is not required in shifting from second to third gear because both of these gears are driven by the second shift fork 92. A single motion pivoting of the main shaft 26 in the pivot plane from the forward position X to the rearward position Z will disengage second gear and engage third gear by moving the second shift fork 92 forwardly. As is apparent, a shift from third gear to fourth gear and then to fifth gear may be accomplished by continual selective rotation of the shift lever 25 and by pivoting of the lever within a single plane.

The above described embodiment of the present invention as illustrated in FIGS. 1-4 is specifically adaptable to a transmission utilizing a remote control shifting unit. However, there are many applications of the present invention in which the shift lever may be disposed adjacent the associated transmission.

FIGS. 6 and 7 illustrate a shift lever 125 adapted for operation with a direct control unit 130 mounted directly on a transmission 190. The lever 125 comprises a main shaft 126 having a generally longitudinal axis 128 about which it is rotatable. The main shaft 126 is also pivotable in a plane containing the main shaft axis 128 as will hereinafter be described.

The direct control unit 130 comprises a housing 114 which is secured to the transmission 190 by any suitable means such as bolts (not shown). A lower portion of the housing 114 comprises a shift lever pivot means 141 containing a generally cylindrical bore 143. An upper portion of the housing 114 contains a cylindrical bore 120 into which fits a plastic shift lever guide 121. The guide 121 comprises an elongated slot 122 having a width approximately equal to the diameter of the main shaft 126. During pivotal movement the slot 122 guides the shaft 126 along a straight path (forward and backward) while preventing lateral movement. A rubber boot 129 is tightly fitted around the plastic guide 121 at one end and grips the main shaft at its other end (not shown). The boot 129 allows pivoting and rotation of the main shaft 126 while keeping dirt and debris out of the transmission.

The main shaft 126 comprises a generally spherical bulb 142 at its lower end which forms a shift lever pivot means. The bulb 142 is rotatably supported in a split nylon bushing 144 retained within the pivot bore 143 by a steel cup retainer 145. In assembling, the main shaft 126 is pushed downward through the bore 143 and the halves of the split bushing 144 are fitted around the bulb 142. The bushing is then forced upward into the bore 143 with the retainer 145 being pressed in place to secure the bushing 144. A projecting means or bracket 136 having a generally longitudinal axis 138 is rigidly secured to the main shaft 126 by welding. The projecting means 136 extends from the main shaft axis 128 at an angle "b" equal to 90° in the present embodiment. A portion of the projecting means 136 radially spaced from the main shaft 126 contains a cylindrical bore 166. The projecting bracket 136 is adapted to drive a shift finger 187 as will hereinafter be described.

The shift finger 187 is mounted on a cylindrical cross shaft 186 having a longitudinal axis 189. The shift finger 187 is rotatable about the shaft 186 and is axially movable thereon in response to rotation and pivoting of the shift lever 125. One end of the finger 187 comprises a generally spherical shift lever engaging means 180 which is fitted within the bore 166 for driving engagement therewith. The other end of the finger 187 comprises an engaging means 188 adapted for drivingly engaging the lugs 194, 195 and 196 which are rigidly affixed to the shift forks 191, 192 and 193 respectively of the transmission 190.

In operation, the shift lever 125 is rotated about the main shaft axis 128 to select a gate or a shift fork to be driven. As the main shaft 126 is rotated, the projecting means 136 moves through an arcuate path about the axis 128, thereby driving the shift finger 187 axially upon the cross shaft 186, and moving the engaging means 188 from alignment with one shift fork into alignment with another shift fork. There will be a minimal rotation of the shift finger 187 about the cross shaft 186 as it moves axially, but this minimal rotation is generally acceptable. In extreme cases the operator may have to pivot the shift lever slightly to properly bring the shift finger into alignment with the selected shift fork.

Figure 8:
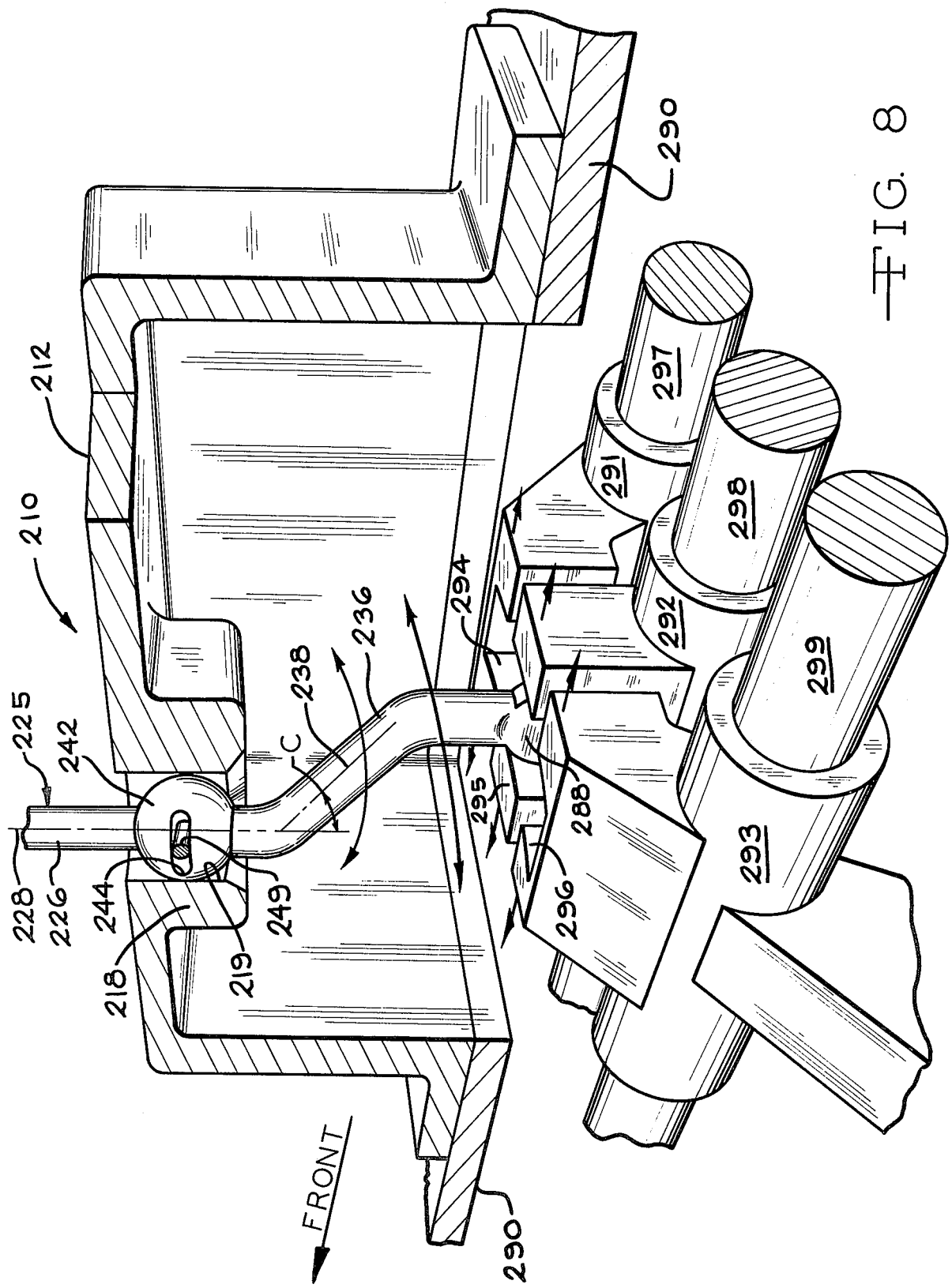
FIG. 8 is an isometric diagramatic view of a second alternate shift mechanism of the present invention adapted for directly engaging the shift forks of an associated transmission.

To further reduce the number of shifting mechanism components, the shift lever of the present invention may be utilized to directly engage the shift forks of an associated transmission, as is illustrated in FIG. 8. A shift assembly 210 comprises a housing 212 which is secured directly onto the top of a transmission 290. The housing 212 comprises a downward projecting flange 218 having a generally cylindrical bore 219 extending therethrough. The transmission 290 contains a plurality of gears (not shown) engageable by means of a plurality of shift forks 291, 292 and 293. Each shift fork rides upon a shift rod 297, 298 and 299, respectively. Shift lugs 294, 295, and 296 are rigidly affixed to the shift forks 291, 292 and 293 respectively.

A shift lever 225 comprises a main shaft 226 having a longitudinal axis 228 about which it is rotatable. A projecting means 236 having a generally longitudinal axis 238 is rigidly affixed to and extends from the main shaft 226 at an angle "c" to the main shaft 228. The projecting shaft 236 is a straight shaft terminating in a downwardly extending shift fork engaging means 288. The engaging means 288 is adapted for selectively driving engagement with each of the shift lugs 294, 295 and 296.

A shift lever pivot means 242 in the form of a generally spherical bulb is disposed between the main shaft 226 and the projecting shaft 236. The bulb 242 is positioned within the bore 219 in the housing 212. The bulb 242 comprises a flattened hourglass shaped bore 244 through which extends a cylindrical pivot pin 249. The pin 249 is secured to the flange 218 to rotatably and pivotably support the shift lever 225. The flattened hourglass bore 244 permits limited rotation of the shift lever 225 about the pin 249 and permits a pivoting of the shift lever in a plane perpendicular to the pin 249. The pin as it cooperates with the bore 244 prevents lateral movement or pivoting of the shift lever 225.

In operation the shift lever 225 is rotated about the pin 249 to select a gate or shift fork which is to be engaged. As the lever is rotated, the shift fork engaging means 288 moves in an arcuate path between the shift fork lugs 294, 295 and 296. When the engaging means 288 is properly aligned with the selected shift fork, a pivoting of the main shaft 226 drives the associated shift fork forward or backward along its associated shift rod.

The foregoing structures have been described for the purpose of illustrating presently preferred embodiments of the invention. Many further modifications or alterations of each of these embodiments may also be made without departing from the spirit and the scope of the invention as set forth in the appended claims.

I claim:
1. A shift mechanism for effecting engagement of transmission gears, said mechanism having a shift lever comprising:
   a main shaft having a generally longitudinal axis, said main shaft rotatable about said main shaft axis, and
   a projecting means adapted for operative association with said transmission gears, said projecting means rigidly attached to said main shaft.
   the improvement wherein said projecting means comprises a second shaft rigidly attached to and radially spaced from said main shaft and wherein said second shaft generally extends at an angle to said main shaft axis.
2. A shift mechanism as defined in claim 1 further comprising means for preventing pivoting of said main shaft in more than substantially one plane.
3. A shift mechanism having a shift lever for operative engagement with a shift bracket, said bracket having a generally longitudinal axis, said bracket rotatable about said bracket axis and movable generally parallel to said bracket axis, said lever comprising:
   a main shaft having a generally longitudinal axis, said main shaft rotatable about said main shaft axis and movable in a plane containing said main shaft axis, and
   a shift bracket engaging means rigidly attached to said main shaft and adapted for drivingly engaging said shift bracket.
   the improvement wherein at least a portion of said shift bracket engaging means is radially spaced from said main shaft axis, whereby at least a portion of said bracket engaging means is movable in an arcuate path in response to said rotation of said main shaft.
4. A shift mechanism as defined in claim 3 further comprising means for preventing movement of said main shaft in more than substantially one plane.
5. A shift mechanism as defined in claim 4 wherein said means of preventing movement comprises a bore in said shift lever and a pivot pin extending through said bore.

6. A shift mechanism as defined in claim 3 wherein said shift bracket engaging means comprises a second shaft rigidly attached to said main shaft, and wherein said second shaft extends at an angle to said main shaft axis.

7. A shift mechanism as defined in claim 3 wherein said shift bracket comprises an offset portion radially spaced from said shift bracket axis and wherein said bracket engaging means drivingly engages said offset portion.

8. A shift mechanism as defined in claim 7 wherein said offset portion comprises an opening adapted to drivingly accept said shift bracket engaging means.

9. A shift mechanism as defined in claim 8 wherein said shift bracket engaging means comprises a second shaft rigidly attached to said main shaft and a bracket pivot means rigidly attached to said second shaft, said bracket pivot means adapted to be pivotally and drivingly contained in said opening of said offset portion.

10. A shift mechanism as defined in claim 9 wherein said bracket pivot means comprises a spherical member and wherein said offset portion comprises a hardened bushing, said bushing positioned at least partially within said opening and adapted for pivotal and driving engagement with said spherical member.

11. A shift mechanism as defined in claim 3 further comprising a shift lever pivot means operatively associated with said main shaft and about which said main shaft is pivotable.

12. A shift mechanism as defined in claim 11 wherein said shift lever pivot means comprises a bore extending through said main shaft in a direction generally perpendicular to said main shaft axis, said bore having a generally flattened hourglass shape wherein the end portions of the bore have a generally elongated cross-section and a center portion has a generally circular cross-section and wherein the major axis of said elongated cross-sections extends in a plane generally perpendicular to said main shaft axis.

13. A shift mechanism as defined in claim 12 wherein said shift lever pivot means further comprises a generally cylindrical pivot pin adapted to extend through said bore.

14. A shift mechanism for operative engagement with a plurality of shift forks of a transmission, said mechanism having a lever comprising:
a main shaft having a generally longitudinal axis, said main shaft rotatable about said main shaft axis and movable in a plane containing said main shaft axis, and
a shift fork engaging means rigidly attached to said main shaft and adapted for drivingly engaging said shift forks.
the improvement wherein at least a portion of said shift fork engaging means is radially spaced from said main shaft axis, whereby said at least a portion of said shift fork engaging means is movable in an arcuate path in response to said rotation of said main shaft.

15. A shift mechanism as defined in claim 14 further comprising means for preventing movement of said main shaft in more than substantially one plane.

16. A shift mechanism as defined in claim 15 wherein said means for preventing movement comprises a guide having an elongated slot through which said shift lever extends.

17. A shift mechanism as defined in claim 14 wherein said shift fork engaging means comprises a second shaft rigidly attached to said main shaft, and wherein said second shaft extends at an angle to said main shaft axis.

18. A shift mechanism as defined in claim 14 further comprising a shift lever pivot means operatively associated with said main shaft and about which said main shaft is pivotable.

19. A shift mechanism as defined in claim 18 wherein said shift lever pivot means comprises a bore extending through said main shaft in a direction generally perpendicular to said main shaft axis, said bore having a generally flattened hourglass shape wherein the end portions of the bore have a generally elongated cross-section and a center portion has a generally circular cross-section and wherein the major axis of said elongated cross-sections extends in a plane generally perpendicular to said main shaft axis.

20. A shift mechanism as defined in claim 19 wherein said shift pivot lever means further comprises a generally cylindrical shaped pivot pin adapted to extend through said bore.

21. In a transmission having a plurality of gears and shift rods, each of said shift rods associated with at least one of said gears, a shift mechanism comprising a shift lever having a generally longitudinal axis and a member directly drivingly engaged by said shift lever, wherein pivoted movement of said shift lever drives said member and rotational movement of said shift lever about said shift lever axis rotates said member to operatively align a portion of said shift mechanism with one of said shift rods.

22. The transmission as defined in claim 21 wherein said shift mechanism is operative to effect engagement of one of said gears upon a pivoting of said shift lever in substantially one plane.

23. The transmission as defined in claim 22 further comprising means for preventing pivoting of said shift lever in more than said substantially one plane.

24. A shift mechanism for effecting engagement of transmission gears, said mechanism having a shift lever comprising:
a main shaft having a generally longitudinal axis, said main shaft rotatable about said main shaft axis, and
a projecting means adapted for operative association with said transmission gears, said projecting means rigidly attached to said main shaft,
the improvement wherein said projecting means comprises a second shaft rigidly attached to and radically spaced from said main shaft and wherein said second shaft generally extends at an angle to said main shaft axis, and wherein said shift mechanism further comprises means for preventing pivoting of said main shaft in more than substantially one plane, said means comprising a shift lever guide having an elongated slot through which said shift lever extends.

* * * * *